US008885507B2

(12) United States Patent
Chen et al.

(10) Patent No.: US 8,885,507 B2
(45) Date of Patent: Nov. 11, 2014

(54) METHOD, APPARATUS AND COMPUTER PROGRAM PRODUCT FOR ALLOCATING RESOURCES IN WIRELESS COMMUNICATION NETWORK

(75) Inventors: Tao Chen, Oulu (FI); Haiming Wang, Beijing (CN); Tao Peng, Beijing (CN)

(73) Assignee: Nokia Corporation, Espoo (FI)

( * ) Notice: Subject to any disclaimer, the term of this patent is extended or adjusted under 35 U.S.C. 154(b) by 18 days.

(21) Appl. No.: 13/514,042

(22) PCT Filed: Dec. 11, 2009

(86) PCT No.: PCT/CN2009/075488
§ 371 (c)(1),
(2), (4) Date: Jun. 5, 2012

(87) PCT Pub. No.: WO2011/069295
PCT Pub. Date: Jun. 16, 2011

(65) Prior Publication Data
US 2012/0243431 A1   Sep. 27, 2012

(51) Int. Cl.
*H04L 12/26* (2006.01)
(Continued)

(52) U.S. Cl.
CPC ........ *H04W 72/0406* (2013.01); *H04W 76/023* (2013.01); *H04W 72/085* (2013.01);
(Continued)

(58) Field of Classification Search
CPC ...... H04W 72/04; H04W 72/08; H04W 24/00
USPC .......................... 370/252, 329; 455/502, 452.1
See application file for complete search history.

(56) References Cited

U.S. PATENT DOCUMENTS 7,333,824 B2 * 2/2008 Zhang et al. .................. 455/502
(Continued)

FOREIGN PATENT DOCUMENTS

| CN | 1441604 A | 9/2003 |
|---|---|---|
| CN | 1536794 | 10/2004 |

(Continued)

OTHER PUBLICATIONS

Janis et al., "Device-to-Device Communication Underlaying Cellular Communications Systems", International Journal Communications, Network and System Sciences, vol. 2, Issue No. 3, Jun., 2009, pp. 169-178.

(Continued)

*Primary Examiner* — Albert T Chou
(74) *Attorney, Agent, or Firm* — Mintz, Levin, Cohn, Ferris, Glovsky & Popeo, P.C.

(57) ABSTRACT

The present application discloses a method, an apparatus and a computer program product for allocating resources for a Device-to-Device (D2D) direct communication user equipment in a wireless communication network, wherein the method comprise: transmitting a communication channel status report regarding Device-to-Device direct communication to a base station; receiving resource allocation instructions generated by the base station based on the communication channel status report; and performing Device-to-Device direct communication between user equipments on the allocated resources; the disclosed apparatus comprises transmitting means for transmitting a communication channel status report regarding Device-to-Device direct communication to a base station; receiving means for receiving resource allocation instructions generated by the base station based on the communication channel status report; and performing means for performing Device-to-Device direct communication between user equipments on the allocated resources. By using the method, apparatus and computer program product disclosed in the present application, resource sharing/allocation collision between the D2D user equipment and cellular user equipment can be effectively reduced and use rate of resources can be improved.

20 Claims, 7 Drawing Sheets

(51) Int. Cl.
*H04W 72/04* (2009.01)
*H04W 76/02* (2009.01)
*H04W 72/08* (2009.01)
*H04W 72/12* (2009.01)
*H04W 74/08* (2009.01)
*H04W 74/00* (2009.01)
*H04W 84/18* (2009.01)
*H04W 92/18* (2009.01)

(52) U.S. Cl.
CPC ............. *H04W 72/12* (2013.01); *H04W 74/085* (2013.01); *H04W 74/002* (2013.01); *H04W 84/18* (2013.01); *H04W 92/18* (2013.01)
USPC ......... 370/252; 370/329; 455/502; 455/452.1

(56) References Cited

U.S. PATENT DOCUMENTS

| | | | |
|---|---|---|---|
| 7,548,758 | B2 | 6/2009 | Periyalwar et al. |
| 2005/0239451 | A1 | 10/2005 | Periyalwar et al. |
| 2009/0011770 | A1* | 1/2009 | Jung et al. ................. 455/452.1 |
| 2012/0093098 | A1* | 4/2012 | Charbit et al. ................ 370/329 |

FOREIGN PATENT DOCUMENTS

| | | |
|---|---|---|
| CN | 1536794 A | 10/2004 |
| CN | 1757256 A | 4/2006 |
| CN | 101388694 A | 3/2009 |
| EP | 0773636 B1 | 10/2002 |
| EP | 1604538 A2 | 12/2005 |
| EP | 1998499 A1 | 12/2008 |
| EP | 2012443 A2 | 1/2009 |
| WO | 2004/077917 A2 | 9/2004 |
| WO | 2006/136995 A2 | 12/2006 |
| WO | 2009/009608 A2 | 1/2009 |

OTHER PUBLICATIONS

International Search Report and Written Opinion received for corresponding International Patent Application No. PCT/CN2009/075488, dated Oct. 8, 2010, 11 pages.

U.S. Application No. 12/409,455, "Apparatus and Method for Interference Avoidance in Mixed Device-To-Device and Cellular Environment", filed on Mar. 23, 2009, 26 pages.

U.S. Application No. 12/558,463, "Method and Apparatus for Providing Interference Measurements for Device-to-Device Communication", filed on Sep. 11, 2009, 52 pages.

Office Action received for corresponding Chinese Application No. 200980162839.2, dated Oct. 28, 2013, 8 pages.

* cited by examiner

METHOD, APPARATUS AND COMPUTER PROGRAM PRODUCT FOR ALLOCATING RESOURCES IN WIRELESS COMMUNICATION NETWORK

RELATED APPLICATION

This application was originally filed as PCT Application No. PCT/CN2009/075488 filed Dec. 11, 2009.

TECHNICAL FIELD

The present invention generally relates to a method, an apparatus and a computer program product for allocating resources in a wireless communication network, and more particularly, to a method, an apparatus and a computer program product for allocating and scheduling resources for Device-to-Device (also referred to as "D2D") direct communication user equipment and cellular user equipment in a hybrid wireless communication network comprising a cellular network and D2D based ad-hoc network.

BACKGROUND

In the current wireless communication networks, e.g., in the 3rd Generation Partnership Project (3GPP) LTE (long-term evolution) cellular wireless communication network, D2D direct communication is a communication mode in which user equipments with TDD mode enabled cellular transceivers directly make peer-to-peer (P2P) communication by sharing/reusing wireless link (Uplink or Downlink) resources of the cellular communication network. In D2D direct communication, there is a plurality of channel access schemes for D2D user equipments to access the wireless communication channels. For example, RTS (Request To Send)/CTS (Clear To Send) supplemented Carrier Sensing Multiple Access/Collision Avoidance (CSMA/CA) as a typical channel access scheme used in most ad-hoc network collaborates with the cellular wireless communication system to enable access and direct communication of D2D user equipment in the cellular environment. For better understanding of the present invention, a channel access mechanism of RTS/CTS-based D2D user equipment is introduced briefly as follows.

When one D2D user equipment (transmitter) intends to transmit a packet to a peripheral another D2D user equipment (receiver), it first transmits RTS packet to request a data channel via a control channel. If there is an idle data channel, the receiver replies with a CTS packet. After the transmitter receives the CTS packet successfully, it proceeds to transmit the actual data packet. Other D2D user equipments in the same area, after hearing the RTS packet transmitted by the transmitter, will defer transmission of their own RTS packets to allow the transmitter to have a sufficiently tong period of time to receive the CTS packet transmitted by the receiver as a response. Other D2D user equipments upon hearing the CTS packet will back off transmission of RTS packet for a period of time that is sufficiently long to allow the receiver to receive the entire data packet, thereby enabling direct communication between the D2D user equipments without interference of nearby D2D user equipments. In such hybrid environment of D2D and cellular communications, resources will be allocated to control channels and data channels for communication. Take RTS/CTS access scheme as an example, the dedicated resources are allocated for RTS/CTS transmission so as to ensure the D2D control channels with RTS/CTS transmit without interference of other channels, and the resources of the corresponding data channels can be shared or reused between D2D and cellular communications.

However, some existing problems in such hybrid D2D and cellular networks are reducing system efficiency. First of all, with regard to resource division, resources in D2D direct communication and cellular communication must be divided reasonably in order to obtain efficient resource sharing/reusing. In the event of unreasonable resource division, for example, if the reserved resources for D2D direct communication are overestimated, it will waste the scare frequency resource and likely degrade the cellular communication performance. On the other hand, the underestimated resource for D2D direct communication would lead to the congestion on D2D access, degrading D2D direct communication performance.

Therefore, how to make efficient resource allocation, particularly how to reasonably allocate resources for D2D direct communication is crucial for acquisition of efficient resource sharing/reusing. Currently, the allocation of communication resources of D2D user equipment and cellular user equipment is typically based on the some static parameters settings. For example, with 10 MHz LTE Uplink frequency band, 2 MHz can be allocated for D2D communication and the remaining 8 MHz is allocated for cellular communication. Obviously such resource division is not suitable for a dynamically changing communication environment as being relatively fixed and thus lacking flexibility and adaptation.

Secondly, with regard to interference problem, since RTS/CTS supplemented CSMA/CA can effectively reduce interference among D2D user equipments, the current D2D user equipments are mainly experiencing two types of interference depending on positions thereof: intra-cell cellular interference and inter-cell cellular interference. When the D2D user equipment is located in the cell edge, resource reusing with cellular user equipment at the edge of the neighbor cell may suffer from the strong co-channel cellular interference due to the high power of communication transmission of the cellular user equipment.

Therefore, in the event of D2D direct communication by virtue of reusing/sharing the uplink resources, how to reduce interference from cellular user equipments, particularly reduce interference from cellular user equipments in the neighbor cell is of most importance for improving D2D direct communication performance. Currently, there is no desirable solution to this problem.

SUMMARY

According to one exemplary embodiment of the present invention, a method comprises:

transmitting a communication channel status report regarding Device-to-Device direct communication to a base station;

receiving resource allocation instructions generated by the base station based on the communication channel status report; and performing Device-to-Device direct communication between user equipments on the allocated resources.

According to another exemplary embodiment of the present invention, a method comprises:

receiving a communication channel status report from a user equipment in Device-to-Device direct communication;

generating resource allocation instructions based on the communication channel status report; and transmitting the resource allocation instructions to the user equipment so that the user equipment performs Device-to-Device direct communication on the allocated resources.

According to one exemplary embodiment of the present invention, an apparatus comprises:

transmitting means for transmitting a communication channel status report regarding Device-to-Device direct communication to a base station;

receiving means for receiving resource allocation instructions generated by the base station based on the communication channel status report; and performing means for performing Device-to-Device direct communication between user equipments on the allocated resources.

According to another exemplary embodiment of the present invention, an apparatus comprises:

receiving means for receiving a communication channel status report from a user equipment in Device-to-Device direct communication;

generating means for generating resource allocation instructions based on the communication channel status report; and transmitting means for transmitting the resource allocation instructions to the user equipment so that the user equipment performs Device-to-Device direct communication on the allocated resources.

According to one exemplary embodiment of the present invention, an apparatus comprises:

at least one processor and at least one memory including compute program code, the memory and the computer program code configured to, with the processor, cause the apparatus at least to perform:

transmitting a communication channel status report regarding Device-to-Device direct communication to a base station;

receiving resource allocation instructions generated by the base station based on the communication channel status report; and performing Device-to-Device direct communication between user equipments on the allocated resources.

According to another exemplary embodiment of the present invention, an apparatus comprises:

at least one processor and at least one memory including compute program code;

the memory and the computer program code configured to, with the processor, cause the apparatus at least to perform:

receiving a communication channel status report from a user equipment in Device-to-Device direct communication;

generating resource allocation instructions based on the communication channel status report; and transmitting the resource allocation instructions to the user equipment so that the user equipment performs Device-to-Device direct communication on the allocated resources.

According to one exemplary embodiment of the present invention, a computer program product, comprising at least one computer readable storage medium having a computer readable program code portion stored thereon, the computer readable program code portion comprising:

program code instructions for transmitting a communication channel status report regarding Device-to-Device direct communication to a base station;

program code instructions for receiving resource allocation instructions generated by the base station based on the communication channel status report; and program code instructions for performing Device-to-Device direct communication between user equipments on the allocated resources.

According to another exemplary embodiment of the present invention, a computer program product, comprising at least one computer readable storage medium having a computer readable program code portion stored thereon, the computer readable program code portion comprising:

program code instructions for receiving a communication channel status report from a user equipment in Device-to-Device direct communication;

program code instructions for generating resource allocation instructions based on the communication channel status report; and program code instructions for transmitting the resource allocation instructions to the user equipment so that the user equipment performs Device-to-Device direct communication on the allocated resources.

By means of implementation of various exemplary embodiments of the present invention, resources in a hybrid network consisting of cellular system and ad-hoc system with RTS/CTS supplemented CSMA/CA can be more effectively used, spectrum efficiency of the wireless communication system can be further improved, wireless resource utilization can be enhanced, and interference between the D2D user equipment and the cellular user equipment in the hybrid network can be reduced.

In addition, adaptive resource allocation and scheduling adjustment can be achieved according to different communication channel status conditions, various exemplary embodiments of the present invention can be effectively applied to Self-Organizing Networks (SON) which consists of self-configuration, self-optimization and self-healing functions. Besides, it can minimize drive-tests (MDT) workload.

BRIEF DESCRIPTION OF DRAWINGS

Various exemplary embodiments of the present invention have been described above in a general sense. For better and full understanding of the present invention, a detailed description will be made with reference to the following accompanying drawings which are not necessarily drawn to scale, wherein.

DETAILED DESCRIPTION

Various embodiments of the present invention will be described in more detailed with reference to the drawings. The various embodiments of the present invention can be embodied in different forms and therefore should be not construed to be limited to the embodiments set forth in the disclosure. Rather, these embodiments are provided herein to enable the present disclosure to meet the applicable legal requirements in contents.

Figure 1:
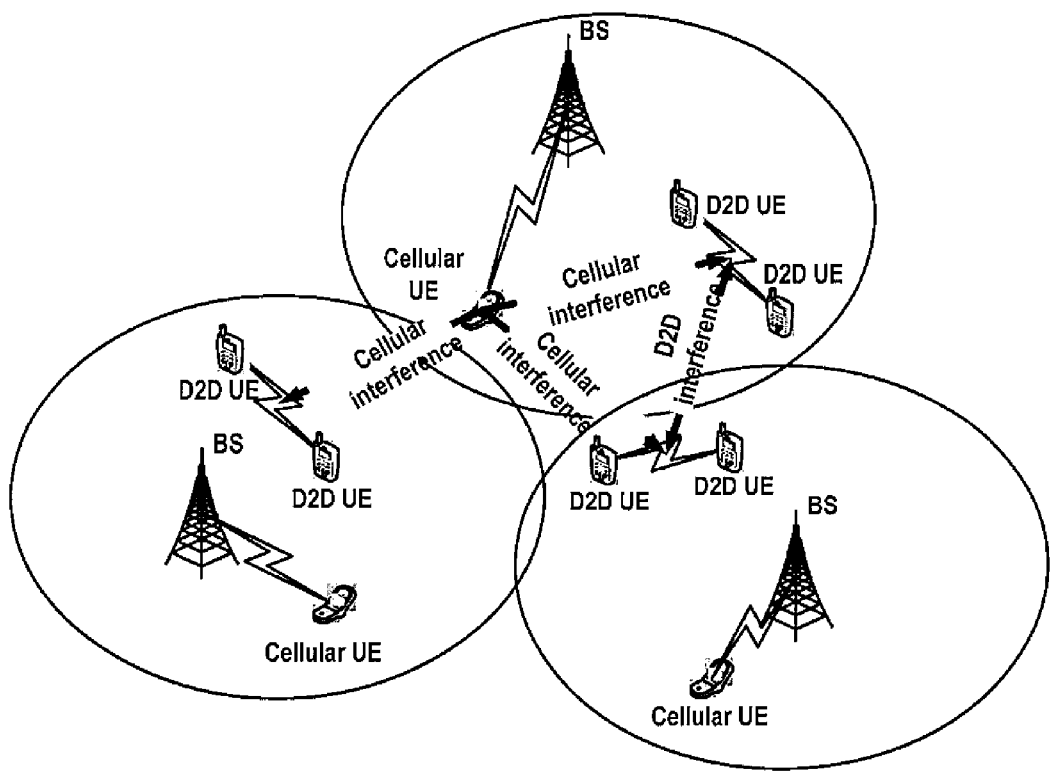
FIG. 1 illustrates an exemplary wireless communication system in which some embodiments of the present invention are implemented.

FIG. 1 illustrates an exemplary wireless communication system in which some embodiments of the present invention is implemented. The wireless communication system is depicted as having three cells each of which comprises a base station (BS or eNB) and a plurality of user equipments performing D2D direct communication and performing cellular communication with the base station in the cells (i.e., D2D user equipments and cellular user equipments).

As shown in the FIG. 1, the user equipment for D2D direct communication might confront with interference from two aspects: one is interference from other user equipments that are right in D2D direct communication, and the other is interference from cellular user equipments that are right in cellular communication with the base station, wherein user equipments for D2D direct communication at the cell edge might confront with strong interference from cellular user equipments in neighboring cells in the adjacent areas.

Figure 2:
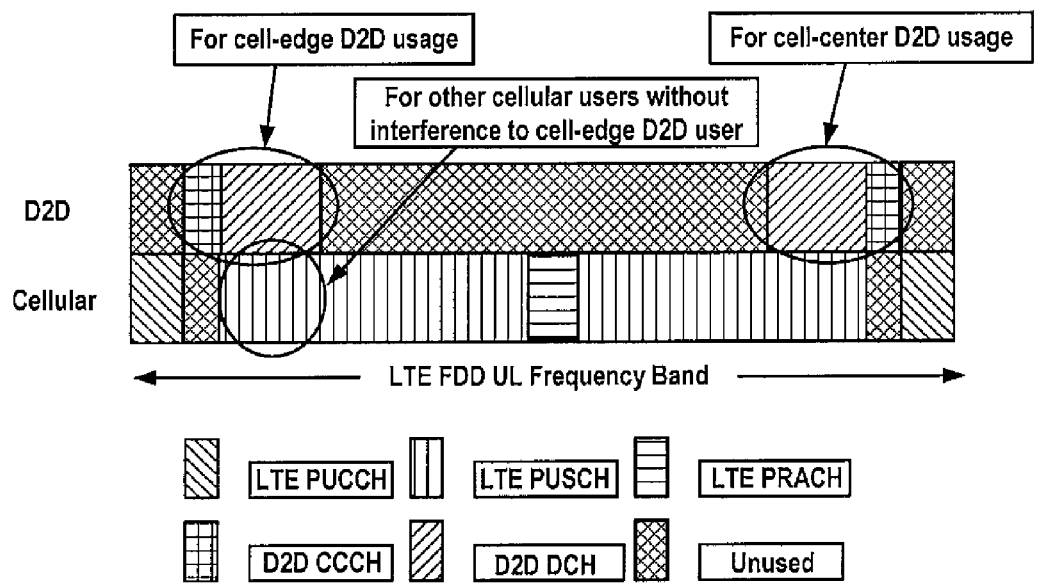
FIG. 2 illustrates an exemplary division of LTE uplink frequency band according to an exemplary embodiment of the present invention.

FIG. 2 illustrates an exemplary division of LTE uplink frequency band according to an exemplary embodiment of the present invention. In the LTE FDD (frequency division duplex) uplink frequency band as shown in the figure, a dedicated frequency band is allocated to a common control channel (CCCH) of the D2D user equipment, and the cellular user equipment cannot perform any transmission on this frequency band, thereby ensuring the D2D common control channel carrying RTS/CTS does not suffer from any interference.

Furthermore, in view of different locations of the D2D user equipments in the cell, a different frequency band (i.e., resource pool) is allocated to a D2D data channel (DCH) sharing/reusing uplink resource with the cellular user equipments for use of D2D user equipments located at the cell edge or at the cell center upon performing data direct transmission. Such division also avoids interference among D2D user equipments at different locations of the cell.

Different from the D2D user equipments at the cell center, the D2D user equipments at the cell edge cannot hear uplink scheduling for cellular users from the base station, so they cannot be voluntarily scheduled to resources not interfering with the cellular user equipments like the D2D user equipments at the cell center, whereupon the base station is required to allocate resources such that the D2D user equipments located at the cell edge can work on the frequency not interfering with the cellular users.

Figure 3:
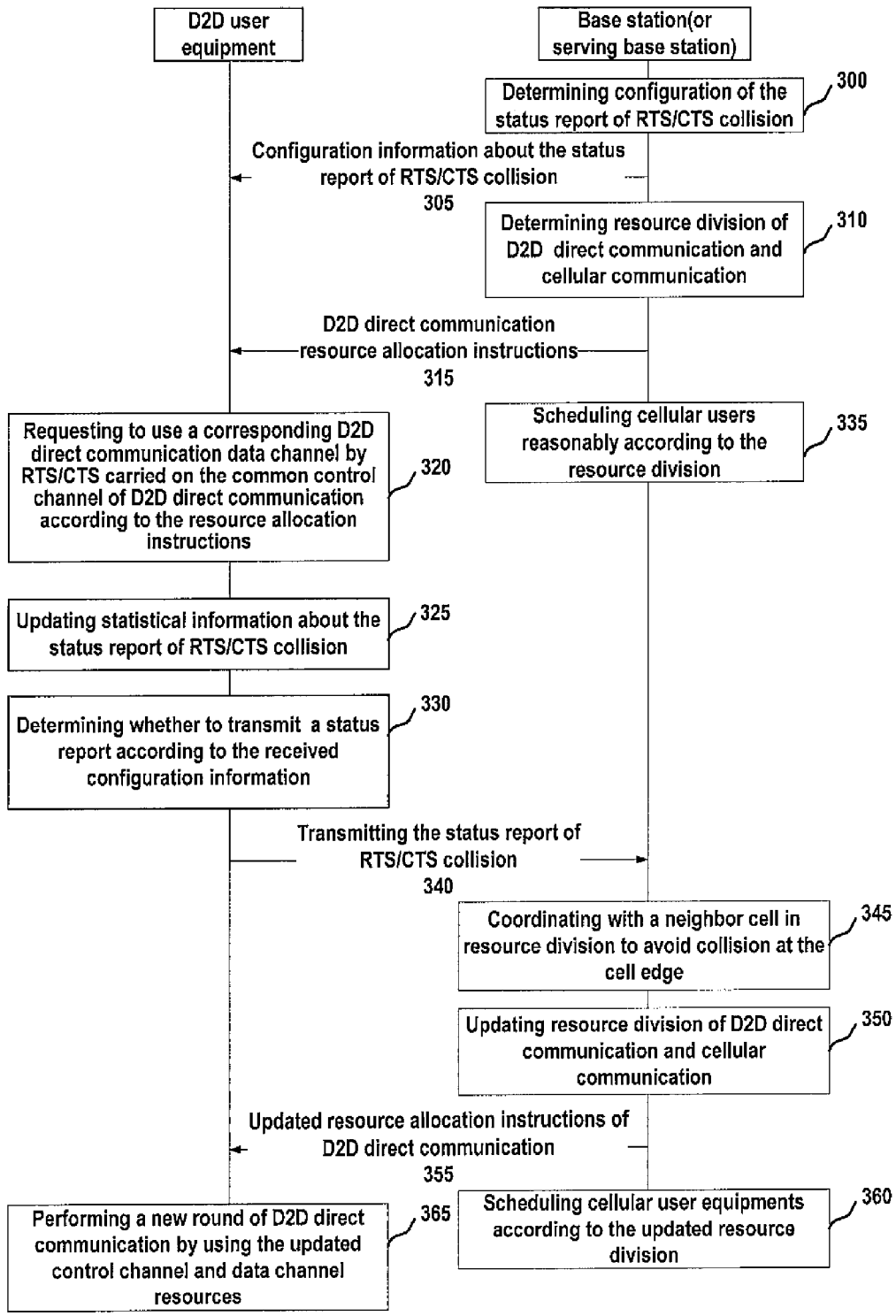
FIG. 3 illustrates a detailed flowchart of method for allocating resources for a D2D user equipment and adjusting resource scheduling for a cellular user equipment accordingly according to an exemplary embodiment of the present invention.

FIG. 3 illustrates a detailed flowchart of method for allocating resources for a D2D user equipment and adjusting resources scheduling for a cellular user equipment accordingly according to an exemplary embodiment of the present invention.

As shown in FIG. 3, initially, in Step 300, the base station (or referred to as serving base station) determines a configuration of a status report of RTS/CTS collision. Since the status report of RTS/CTS collision may comprise a plurality of items, thus initially the base station may configure them to determine what kind of items the RTS/CTS collision status report should contain, as well as a cycle and conditions for transmitting the report.

The status report of RTS/CTS collision comprises at least one of collision ratio and collision indicator, wherein collision ratio is a ratio of times that the D2D user equipment attempts D2D direct communication but fails to a total of times for attempting D2D direct communication in a period of time, and collision indicator is used to indicate whether a single D2D direct communication attempt is successful or not.

The status report of RTS/CTS collision may further comprise any combination of collision channel index, time stamp, location information, cell-edge/center indicator, and a neighbor cell list and so on. These additional items can help the base station more accurately determine the situations of collision occurrences. Of the items, the collision channel index indicates on which communication channel the collision happens, time stamp indicates the time when the attempt happens, location information indicates the location of the current D2D user equipment in the cell, the cell-edge/center indicator denotes whether the current D2D user equipment locates at the cell edge or the cell center and thus denotes the resources pools currently used by the D2D user equipment (resource pools herein refer to the different frequency bands as divided in FIG. 2), and the neighbor cell list lists the neighboring cells adjacent to the D2D user equipment.

The cell-edge/center indicator can be determined by a weighting based on any one of pathloss, UPH (User Equipment Power Headroom, which indicates the available power for the data transmission of the user equipment), interference level (the size of the received interference power), G factor (i.e., Geometry factor for indicating the distance of the D2D user equipment away from the base station and can be expressed by the formula $G=Ior/(Ioc+N0)$, wherein Tor is the total base station transmission power, Ioc is the power of the inter cell interference and N0 is the noise power) and data packet sizes (different packet sizes are selected depending on the distance from the base station for data transmission), thereby determining on this basis a corresponding resource pool (e.g., the frequency band as shown in FIG. 2) of the D2D user equipment.

Then, in step 305, the base station transmits configuration information about the status report of RTS/CTS collision to the D2D user equipment in the cell it serves. The D2D user equipment will transmit the status report of RTS/CTS collision to the base station according to the above configuration information.

In step 310, the base station determines resource division of D2D direct communication and cellular communication, e.g., the resource division as depicted in FIG. 2. Subsequently, in step 315, the base station transmits resource allocation instructions for D2D direct communications to the D2D user equipment. In step 320, the D2D user equipment in the cell requests to use a corresponding D2D direct communication data channel by the RTS/CTS carried on the common control channel of D2D direct communication according to the received resource allocation instructions. Herein different D2D direct communication common control channels correspond to their respective different D2D direct communication data channels.

It should be appreciated that the initiation process between the base station and the D2D user equipments involved by the above steps are not requisite for the present invention. The initial configuration information can be preset at the base station and D2D user equipments, so these initiation steps can be omitted.

In Step 325, the D2D user equipment updates statistics information in the status report of RTS/CTS collision according to the practical communication situations. Specifically, for example, when the D2D user equipment A attempts for D2D direct communication with another D2D user equipment B, it transmits RTS to the equipment B. When there is an idle data channel, the equipment B transmits CTS to the equipment A, indicating that the equipment A can transmit data, whereupon the equipment A can updates the total of times of D2D direct communication attempts in the status report of RTS/CTS collision (e.g., plus 1), or can set the collision indicator as 1 to indicate that D2D direct communication attempt of this time is successful, When no CTS transmitted back by the equipment B is received, this indicates that there is no idle data channel at this time, whereupon the equipment A can set the collision indicator as zero to indicate that D2D direct communication attempt of this time fails, and meanwhile updates the total of times of D2D direct communication attempts and the times of failure of D2D direct communication attempts, thereby calculating the collision ratio.

Analogously, the D2D user equipment can additionally record the above-mentioned additional items, for example, record on which channel the collision happens (according to correspondence between the RTS/CTS control channel and data channel), the position where the collision happens (e.g., provided by GPS signal or via wireless measurement), time stamp (specific time of collision occurrence) and the neighbor cell list and so on.

In step 330, the D2D user equipment determines whether to transmit the report according to report transmitting conditions in the received configuration information of the status report of RTS/CTS collision. Alternatively, the transmitting of the report can be periodic (e.g., 10 seconds) or triggered by events (e.g., when the collision ratio reaches a predetermined threshold).

During D2D direct communication of the D2D user equipment, the base station reasonably schedules the cellular user equipments in step 335 according to resource division made in step 310 to avoid interference with the D2D user equipment. This step can be executed immediately after the step 310 to rapidly apply the divided resources for the cellular user equipments.

In step 340, the D2D user equipment can transmit the status report of RTS/CTS collision to the base station for example by PUSCH (physical uplink shared channel) of LTE.

In step 345, after the base station receives the status report of RTS/CTS collision of the user equipment, it will adjust the resources of the user equipment accordingly based on the report. Specifically, when the base station determines presence of collision in the cell based on some items (e.g., collision ratio or collision indicator) in the status report of RTS/CTS collision, e.g., when several collisions happen in some special areas in the cell (determined in combination with the location information or time stamp in the report), it judges whether to re-allocate the resources of the D2D user equipment according to the collision ratio or collision indicator in the report. For instance when the collision ratio or the collision indicator information collected at the base station is greater than a certain threshold, the base station can determine to increase the corresponding D2D user equipment resources, e.g., allocate more idle frequency bands to the D2D user equipment, thereby reducing D2D direct communication collision ratio of the D2D user equipment and improving the use ratio of the resources.

In addition, the base station can simultaneously consider scheduling the resources not for D2D direct communication to cellular user equipments in a given area, or schedule resources allocated to D2D direct communication to the cellular user equipments not interfering or slightly interfering the D2D user equipment, thereby improving the use ratio of resources.

when, in combination with the neighbor cell list, the location information and the cell-edge/center indicator in the status report of RTS/CTS collision, the base station determines that failure of D2D direct communication of the D2D user equipment in the present cell is caused by collision with a D2D user equipment in a neighbor cell, it will re-allocate the resources provided to the D2D user equipment after coordinating with the base station of the neighbor cell for example by an X2 interface.

For example, the base station of the present cell determines on which resources that the collision happens based on the collision channel index information in the status report of RTS/CTS collision and reports information in this regard to the base station in the neighbor cell which, upon acquisition of such information, allocates resources different from such information to the D2D users at the cell edge thereof to avoid D2D direct communication collision between the cells. Alternatively, the two base stations can determine to jointly allocate more identical resources (e.g., a greater segment of common frequency band) to their respective D2D user equipments at the cell edges. As such, both of the two base stations will not schedule the cellular users at the cell edges to use D2D direct communication resources at the cell edges, thereby reducing their interference with the D2D user equipments.

Then, in step 350, after making the above determinations based on the status report of RTS/CTS collision, the base station updates resources division of D2D direct communication and the cellular communication accordingly. In step 355, the base station can transmit resource allocation instructions to the D2D user equipment via a dedicated signaling or in a broadcasting form according to the number of the D2D user equipments in collision.

In step 360, the base station reasonably schedules the cellular user equipments based on the updated resource allocation, and the D2D user equipment performs access and D2D direct communication between user equipments on the re-allocated resources of the base station. By the above method, adaptive allocation of the resources can be done according to the current communication situations of the current D2D user equipment, and resource scheduling of the cellular user equipment is adaptively scheduled accordingly.

Figure 4:
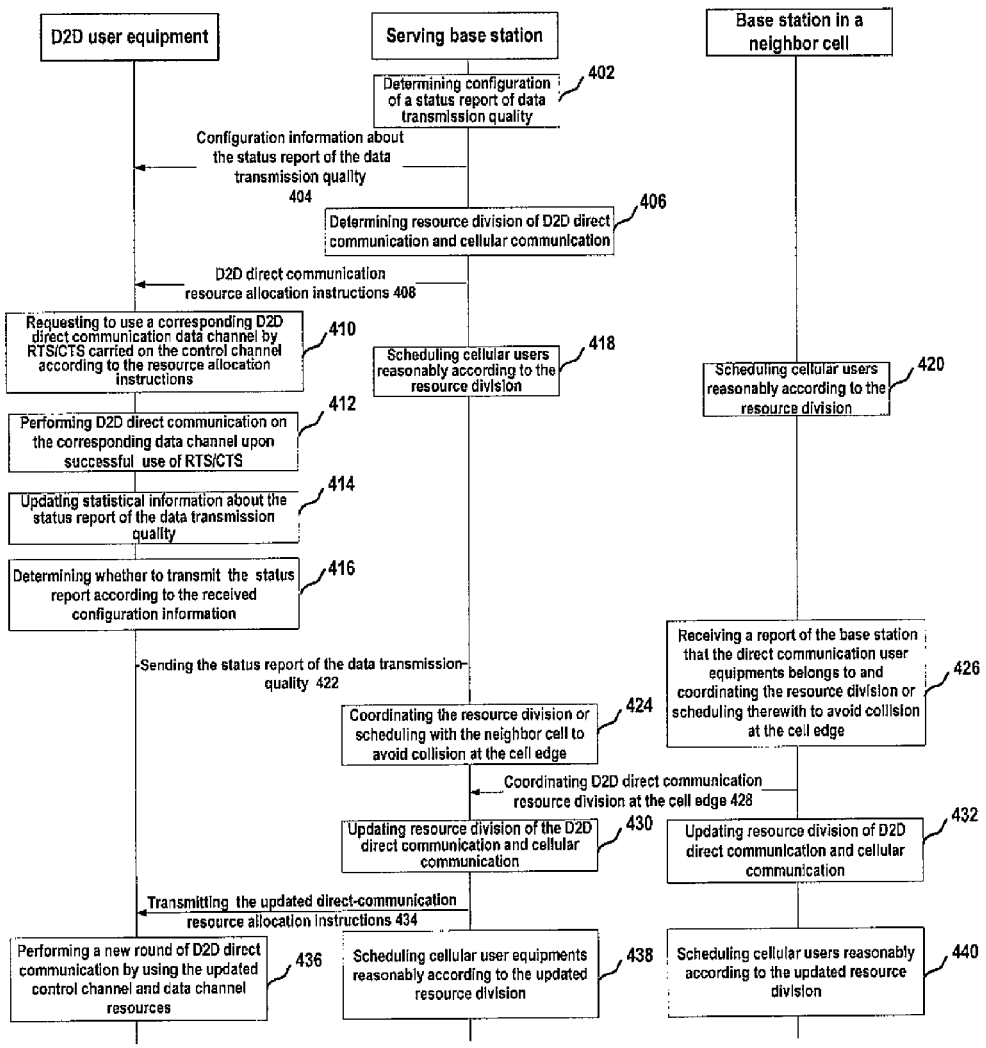
FIG. 4 illustrates a detailed flowchart of a method for allocating resources for a D2D user equipment and adjusting resource scheduling for a cellular user equipment accordingly according to another exemplary embodiment of the present invention.

FIG. 4 illustrates a detailed flowchart of a method for allocating resources for a D2D user equipment and adjusting resource scheduling for a cellular user equipment accordingly according to another exemplary embodiment of the present invention.

As shown in FIG. 4, initially in step 402, the base station (or referred to as serving base station to distinguish from a base station in a neighbor cell) determines a configuration of a status report of the data transmission quality transmitted by the D2D user equipment. Like the above-mentioned configuration of the status report of RTS/CTS collision, the status report of the data transmission quality can comprise a plurality of items, thus initially the base station may configure them to determine what kind of items the report should contain, as well as a cycle and conditions for transmitting the report.

The status report of data transmission quality comprises at least one of BLER (Block Error Rate), interference level on data channel, and quality indicator, wherein the BLER is a ratio of error occurrences in the transmitted data blocks, the interference level on data channel refers to the interference power received on the data channel and the quality indicator indicates whether the data transmission at this time is successful or not.

Alternatively, the status report of the data transmission quality can further comprise any combination of collision channel index (the collision herein refers to channel interference between the cellular user equipments and the D2D user equipments), time stamp, location information, cell-edge/ center indicator, and a neighbor cell list. These items have analogous meaning to those in the status report of RTS/CTS collision. By virtue of these additional report items, the serving base station can more accurately and thoroughly understand data transmission status of the current D2D user equipments.

In step 404, the serving base station transmits configuration information of the status report of the data transmission quality containing the above-mentioned several items to the D2D user equipment. Furthermore, in step 406, the serving base station determines resource division of D2D direct communication and cellular communication, for example, the exemplary resource division as shown in FIG. 2.

Then in step 408, the serving base station transmits D2D direct communication resource allocation instructions to the D2D user equipment. In step 410, the D2D user equipment requests to use a corresponding D2D direct communication data channel by RTS/CTS carried on the control channel according to the resource allocation instructions, and further, in step 412, after a successful use of RTS/CTS (i.e., CTS is successfully received after the RTS is transmitted), the D2D user equipment performs D2D direct communication with another D2D user equipment on a corresponding data channel.

In step 414, the D2D user equipment updates the corresponding statistical information of the items in the status report of the data transmission quality. Specifically, the D2D user equipment can record the BLER of data blocks transmitted each time, the interference power received on the data channel and success or failure of the data transmission. Furthermore, in step 416 whether to transmit the report to the serving base station is determined by judging the conditions for transmitting the report are satisfied or not. For example, whether to transmit the report is determined by judging whether the recorded BLER is less than a certain threshold, whether the interference power is greater than a certain threshold, as well as times of success or failure of data transmission.

In step 422, when report transmitting conditions specified in the configuration information of the status report of the data transmission quality are satisfied (e.g., the above multiple judging conditions are satisfied), the status report of the data transmission quality is transmitted to the serving base station. Alternatively, the status report of the data transmission quality is transmitted to the serving base station periodically or by triggered by events.

When the serving base station receives the status report of the data transmission quality from the D2D user equipment, it determines the current data transmission situation of the D2D user equipment based on the received report. Since the D2D user equipment can only performs data transmission after the use of RTS/CTS is successful, the D2D user equipment for data transmission generally does not suffer from interference from other D2D user equipments, and the interference probability from the cellular user equipments in the present cell is substantially reduced due to the scheduling of the base station of the present cell. Therefore, whether the data transmission is successful or not depends to a large extent on the interference from the cellular user equipments in the neighbor cell.

When the serving base station observes that the rate of success of data transmission in the status report of the data transmission quality is very low or the interference is too high, it, analogous to the operations executed with respect to the status report of RTS/CTS collision, transmits, in steps 424 and 426, resource scheduling instructions to the base station in the neighbor cell and coordinates resources with the base station in the neighbor cell so that the base station in the neighbor cell carries out corresponding resources scheduling adjustment for the cellular user equipments, for example, schedules the cellular user equipments at the cell edge to the resource not interfering with the D2D user equipments to prevent the cellular user equipments in the neighbor cell from interfering with the D2D user equipments at the cell edge.

Alternatively, the serving base station transmits the status report of the data transmission quality or a report in other forms to the base station in the neighbor cell to instruct the base station in the neighbor cell to schedule the resources of the cellular user equipments it serves to the resources not interfering with the D2D user equipment. Thereafter, in steps 430 and 432, the serving base station and the base station in the neighbor cell, after the corresponding coordination, update their respective resources for D2D direct communication and cellular communication accordingly, i.e., resource re-division.

In step 440, the base station in the neighbor cell performs corresponding resources scheduling adjustment for its cellular user equipments based on the re-divided resources, for example, the base station in the neighbor cell can, according to information regarding time stamp and location provided by the serving base station, determine which cellular user equipments in the neighbor cell interferes with the D2D user equipments that are right in D2D direct communication when interference happens, i.e., adjust the resources scheduling of these cellular user equipments to remove interference.

In step 436, the D2D user equipment performs a new round of D2D direct communication on the re-allocated resources based on the updated D2D direct communication resource allocation instructions sent by the serving base station in step 434. In step 438, the serving base station schedules the cellular user equipments it serves and performs corresponding resource scheduling adjustment for the cellular user equipments it serves based on the new resource division.

Similarly, the above initiation process between the serving base station, the base station in the neighbor cell and user equipment involved in the above steps are not requisite for the present invention. The initial configuration information can be preset at the base stations and on the user equipments, so these initiation steps can be omitted. It should be noted herein that the steps and execution order disclosed in the figures are only illustrative but not limited. Those skilled in the art, taught by the present disclosure, can change these steps, for example, omit some of the steps, change the execution order of some steps or add extra steps so as to adapt to different application demands. Meanwhile, to make the present invention more comprehensible, the above description omits some technical details which are well known for those skilled in the art and requisite for fulfillment of the present invention.

Figure 5:
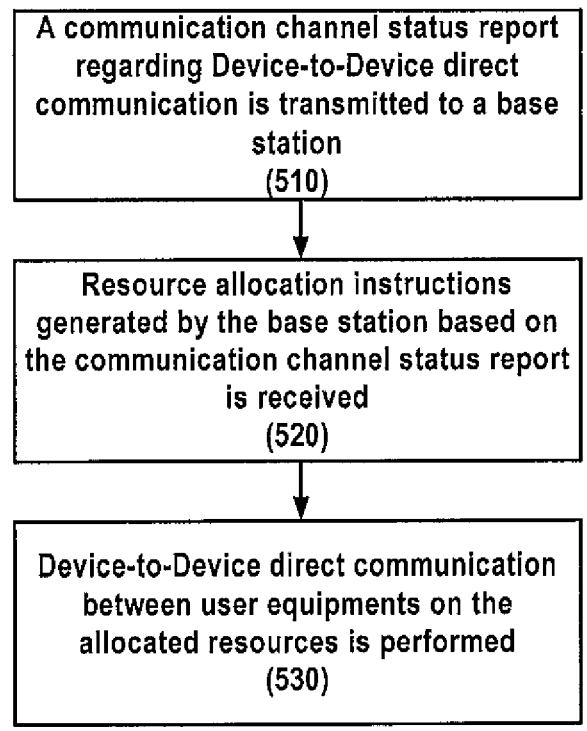
FIG. 5 illustrates a simplified flowchart of a method for allocating resources for a D2D user equipment according to an exemplary embodiment of the present invention.

FIG. 5 illustrates a flowchart of a method for allocating resources for a D2D user equipment according to an exemplary embodiment of the present invention. As shown in FIG. 5, in step 510, a communication channel status report regarding D2D direct communication is transmitted to a base station. In step 520, resource allocation instructions generated by the base station based on the communication channel status report is received. In step 530, D2D direct communication between user equipments on the allocated resources is performed.

Figure 6:
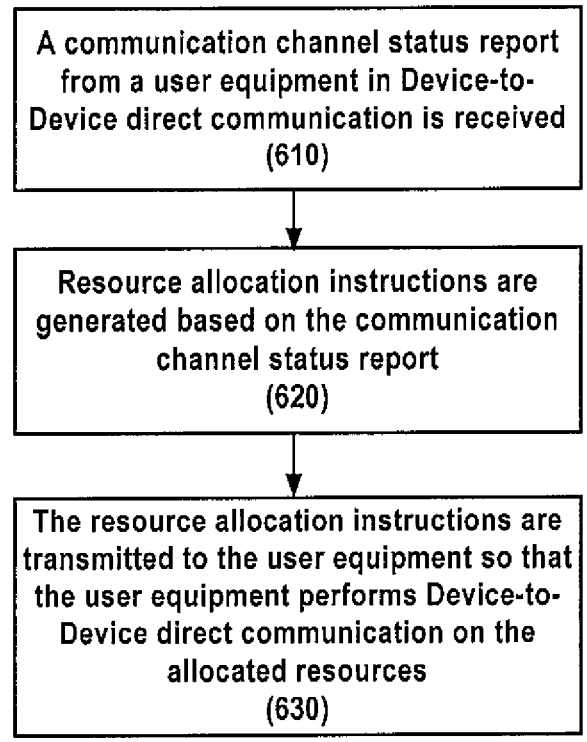
FIG. 6 illustrates a simplified flowchart of a method for allocating resources for a D2D user equipment according to another exemplary embodiment of the present invention.

FIG. 6 illustrates a simplified flowchart of a method for allocating resources for a D2D user equipment according to another exemplary embodiment of the present invention. As shown in FIG. 6, in step 610, a communication channel status report from a user equipment in D2D direct communication is received. In step 620, resource allocation instructions are generated based on the communication channel status report. And in step 630, the resource allocation instructions are transmitted to the user equipment so that the user equipment performs D2D direct communication on the allocated resources.

Figure 7:
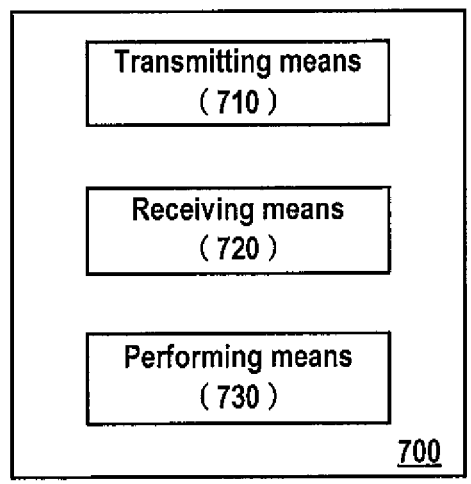
FIG. 7 illustrates a block diagram of an apparatus for allocating resources for a D2D user equipment according to an exemplary embodiment of the present invention.

FIG. 7 illustrates a block diagram of an apparatus 700 for allocating resources for a D2D user equipment according to an exemplary embodiment of the present invention. As shown in FIG. 7, the apparatus 700 comprises a transmitting means 710, a receiving means 720 and a performing means 730, wherein the transmitting means 710 is used to transmit a communication channel status report regarding D2D direct communication to a base station, the receiving means 720 is used to receive resource allocation instructions generated by the base station based on the communication channel status report, and the performing means is used to perform D2D direct communication between user equipments on the allocated resources.

Figure 8:
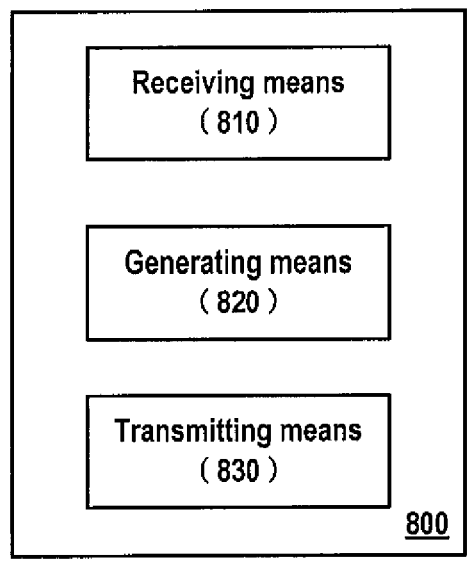
FIG. 8 illustrates a block diagram of an apparatus for allocating resources for a D2D user equipment according to another exemplary embodiment of the present invention.

FIG. 8 illustrates a block diagram of an apparatus 800 for allocating resources for a D2D user equipment according to another exemplary embodiment of the present invention. As shown in FIG. 8, the apparatus 800 comprises a receiving means 810, a generating means 820 and a transmitting means 830, wherein the receiving means 810 is used to receive a communication channel status report from a user equipment in D2D direct communication, the generating means 820 is used to generate resource allocation instructions based on the communication channel status report, and the transmitting means 830 is used to transmit the resource allocation instructions to the user equipment so that the user equipment performs D2D direct communication on the allocated resources.

Figure 9:
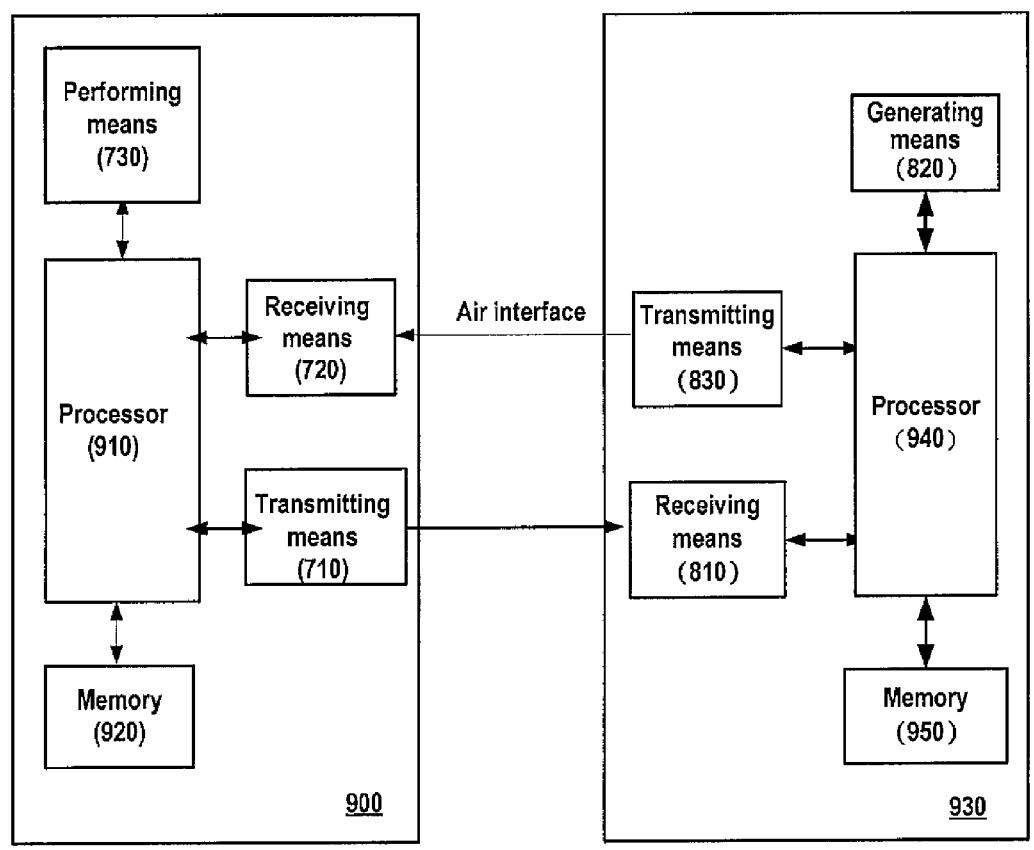
FIG. 9 illustrates a schematic block diagram of interaction of the apparatuses for allocating resources for a D2D user equipment according to an exemplary embodiment of the present invention.

FIG. 9 illustrates a schematic block diagram of the interaction of the apparatuses for allocating resources for a D2D user equipment according to an exemplary embodiment of the present invention. As shown at left hand of FIG. 9, besides the transmitting means 710, the receiving means 720 and the performing means 730 which operate in the same way as the plurality of means as shown in FIG. 7, an apparatus 900 includes a processor 910 and a memory 920. Similarly, as shown at right hand of FIG. 9, besides the receiving means 810, the generating means 820 and the transmitting means 830 which operate in the same way as the plurality of means as shown in FIG. 8, an apparatus 930 includes a processor 940 and a memory 950. In the exemplary embodiment of the present invention, the processor 910 or 940 may be embodied as, include or otherwise control a plurality of means above to cause the apparatus 900 or 930 to perform the methods as shown in FIGS. 5 and 6 in a interactive way (for example, transmitting operation performed by the D2D user equipment and receiving operation performed by the Base station, as explained in detail above) through the air interface.

The processor, such as processor 910 or 940, may be embodied in a number of different ways. For example, the processor may be embodied as one or more of various processing means such as a coprocessor, a microprocessor, a controller, a digital signal processor (DSP), a processing element with or without an accompanying DSP, or various other processing devices including integrated circuits such as, for example, an ASIC (application specific integrated circuit), an FPGA (field programmable gate array), a hardware accelerator, a special-purpose computer chip, or the like. In the exemplary embodiment of the present invention, the processor may be configured to execute instructions stored in the memory, such as memory 920 or 950, or otherwise accessible to the processor.

The memory may include, for example, one or more volatile and/or non-volatile memories. The memory may be configured to store information, data, applications, instructions or the like for enabling the apparatus 900 or 930 to carry out various functions (such as the steps of the methods as mentioned above) in accordance with exemplary embodiments of the present invention. For example, the memory 920 or 950 could be configured to store instructions while the processor 910 or 940 may be configured to control the functions of a plurality of means through computer program instructions (e.g., software and/or firmware) stored on the memory 920 or 950.

Noticeably, although some exemplary embodiments of the present invention illustrates resource allocation by adding D2D user equipment resources, those skilled in the art, based on the present disclosure, can understand that the resource allocation herein does not only includes the case of addition of D2D user resources but also cases in which the D2D user equipment resources are reduced adaptively at a certain time or based on the communication channel status or maintained constant.

For example, when the communication channel status report (e.g., the status report of RTS/CTS collision or status report of the data transmission quality) transmitted to the base station reveals the collision ratio or BLER is very low but at this time the communication traffic volume of the cellular user equipments in the cell is relatively high, resources (including the control channel resources carrying RTS/CTS and the corresponding data channel resources) allocated to the D2D user equipments can be reduced when necessary for the use of the cellular user equipments.

Additionally, although the exemplary embodiments take RTS/CTS access scheme as an example to illustrate the concept and principle of the present invention, it should be noted that the present invention is not limited thereto. A person skilled in the art can readily appreciate that any other access schemes can be used with the present invention without departing the spirit and scope of the present invention.

As described above and as will be appreciated by one skilled in the art, embodiments of the present invention may be configured as a system, method, or electronic device. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Exemplary embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus (such as processor) to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Many modifications and other embodiments of the inventions set forth herein will come to mind to one skilled in the art to which these exemplary embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method, comprising:
   transmitting, by a user equipment to a base station, a communication channel status report regarding device-to-device direct communication;
   receiving, by the user equipment, resource allocation instructions generated by the base station based on at least the communication channel status report, wherein the resource allocation instructions is received based on at least the base station coordinating resources with another base station in at least one neighbor cell, when a collision and/or interference between user equipments in device-to-device direct communication and at least one cellular user equipment in the at least one neighbor cell is determined based on at least the communication channel status report; and
   performing device-to-device direct communication between user equipments based on at least the received resource allocation instructions.

2. The method according to claim 1, wherein the communication channel status report is a status report of request to send/clear to send collision or a status report of data transmission quality of the user equipment in the device-to-device direct communication.

3. The method according to claim 2, wherein the status report of request to send/clear to send collision or the status report of the data transmission quality further comprises any combination of collision channel index, time stamp, location information, cell-edge/center indicator, and a neighbor cell list.

4. The method according to claim 3, wherein the cell-edge/center indicator is determined based on at least a weighting of any one of pathloss, user equipment power headroom, interference level, geometry factor and data packet size.

5. A method, comprising:
   receiving, by a base station, a communication channel status report from a user equipment in device-to-device direct communication;
   generating, by the base station, resource allocation instructions based on at least the communication channel status report; and
   transmitting, by the base station, the resource allocation instructions to the user equipment so that the user equipment performs device-to-device direct communication on the allocated resources, wherein the resource allocation instructions is transmitted based on at least the base station coordinating resources with another base station in at least one neighbor cell, when a collision and/or interference between user equipments in device-to-device direct communication and at least one cellular user equipment in the at least one neighbor cell is determined based on at least the communication channel status report.

6. The method according to claim 5, wherein the communication channel status report comprises a status report of request to send/clear to send collision or a status report of data transmission quality of the user equipment in the device-to-device direct communication, wherein the data transmission quality comprises at least one of block error rate, interference level on data channel, and quality indicator.

7. The method according to claim 6, wherein the status report of request to send/clear to send collision or the status report of data transmission quality further comprises any combination of collision channel index, time stamp, location information, cell-edge/center indicator and a neighbor cell list.

8. The method according to claim 6, wherein when the collision is determined based on at least the request to send/clear to send collision information in the status report, the resource allocation instructions are transmitted to the user equipments in device-to-device direct communication after resource scheduling of cellular user equipments is adjusted according to the coordination of the base station with the another base station in the at least one neighbor cell.

9. The method according to claim 6, wherein when the interference is determined based on at least the data transmission quality information in the status report, the resource allocation instructions are transmitted to the user equipments in device-to-device direct communication after resource scheduling of cellular user equipments is adjusted according to the coordination of the base station with the another base station in the at least one neighbor cell.

10. An apparatus, comprising:
    at least one processor and at least one memory including compute program code,
    the memory and the computer program code configured to, with the processor, cause the apparatus at least to perform at least the following:

transmit a communication channel status report regarding device-to-device direct communication to a base station;
receive resource allocation instructions generated by the base station based on at least the communication channel status report, wherein the resource allocation instructions is received based on at least the base station coordinating resources with another base station in at least one neighbor cell, when a collision and/or interference between user equipments in device-to-device direct communication and at least one cellular user equipment in the at least one neighbor cell is determined based on the communication channel status report; and
perform device-to-device direct communication between user equipments on the received resource allocation instructions.

11. The apparatus according to claim 10, wherein the communication channel status report comprises a status report of request to send/clear to send collision or a status report of data transmission quality of the user equipment in the device-to-device direct communication.

12. The apparatus according to claim 11, wherein the status report of request to send/clear to send collision or the status report of the data transmission quality further comprises any combination of collision channel index, time stamp, location information, cell-edge/center indicator, and a neighbor cell list.

13. The apparatus according to claim 12, wherein the apparatus is further configured to determine the cell-edge/center indicator based on at least a weighting of any one of pathloss, user equipment power headroom, interference level, geometry factor and data packet size.

14. An apparatus, comprising:
at least one processor and at least one memory including compute program code,
the memory and the computer program code configured to, with the processor, cause the apparatus at least to perform at least the following:
receive a communication channel status report from a user equipment in device-to-device direct communication;
generate resource allocation instructions based on at least the communication channel status report; and
transmit the resource allocation instructions to the user equipment so that the user equipment performs device-to-device direct communication on the allocated resources, wherein the resource allocation instructions is transmitted based on at least the base station coordinating resources with another base station in at least one neighbor cell, when a collision and/or interference between user equipments in device-to-device direct communication and at least one cellular user equipment in the at least one neighbor cell is determined based on at least the communication channel status report.

15. The apparatus according to claim 14, wherein the communication channel status report comprises a status report of request to send/clear to send collision or a status report of data transmission quality of the user equipment in the device-to-device direct communication.

16. The apparatus according to claim 15, wherein the status report of request to send/clear to send collision or the status report of data transmission quality further comprises any combination of collision channel index, time stamp, location information, cell-edge/center indicator and a neighbor cell list.

17. The apparatus according to claim 15, wherein when the collision is determined based on at least the request to send/clear to send collision information in the status report, the apparatus is configured to transmit the resource allocation instructions to the user equipments in device-to-device direct communication via a dedicated signaling or broadcast after resource scheduling for cellular user equipments is adjusted according to the coordination of the base station with the another base station in the at least one neighbor cell.

18. The apparatus according to claim 15, wherein when the interference is determined based on at least the data transmission quality information in the status report, the apparatus is configured to transmit the resource allocation instructions to the user equipments in device-to-device direct communication after resource scheduling for cellular user equipments is adjusted according to the coordination of the base station with the another base station in the at least one neighbor cell.

19. A non-transitory computer-readable medium encoded with instructions that, when executed by at least one processor, perform at least the following:
transmitting a communication channel status report regarding device-to-device direct communication to a base station;
receiving resource allocation instructions generated by the base station based on at least the communication channel status report, wherein the resource allocation instructions is received based on at least the base station coordinating resources with another base station in at least one neighbor cell, when a collision and/or interference between user equipments in device-to-device direct communication and at least one cellular user equipment in the at least one neighbor cell is determined based on at least the communication channel status report; and
performing device-to-device direct communication between user equipments on the received resource allocation instructions.

20. A non-transitory computer-readable medium encoded with instructions that, when executed by at least one processor, perform at least the following:
receiving a communication channel status report from a user equipment in device-to-device direct communication;
generating resource allocation instructions based on at least the communication channel status report; and
transmitting the resource allocation instructions to the user equipment so that the user equipment performs device-to-device direct communication on the allocated resources, wherein the resource allocation instructions is transmitted based on at least the base station coordinating resources with another base station in at least one neighbor cell, when a collision and/or interference between user equipments in device-to-device direct communication and at least one cellular user equipment in the at least one neighbor cell is determined based on at least the communication channel status report.

* * * * *